(12) United States Patent
Ikeda

(10) Patent No.: US 12,124,750 B2
(45) Date of Patent: Oct. 22, 2024

(54) IMAGE PROCESSING APPARATUS, METHOD FOR CONTROLLING IMAGE PROCESSING APPARATUS, AND STORAGE MEDIUM

(71) Applicant: CANON KABUSHIKI KAISHA, Tokyo (JP)

(72) Inventor: Toru Ikeda, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/076,617

(22) Filed: Oct. 21, 2020

(65) Prior Publication Data
US 2021/0124537 A1    Apr. 29, 2021

(30) Foreign Application Priority Data

Oct. 25, 2019   (JP) .................................. 2019-194554

(51) Int. Cl.
| | | |
|---|---|---|
| *G06F 3/12* | (2006.01) |
| *G06F 3/0482* | (2013.01) |
| *G06F 3/04883* | (2022.01) |
| *G06F 21/31* | (2013.01) |
| *G06F 21/60* | (2013.01) |

(52) U.S. Cl.
CPC .......... *G06F 3/1253* (2013.01); *G06F 3/0482* (2013.01); *G06F 3/04883* (2013.01); *G06F 21/31* (2013.01); *G06F 21/608* (2013.01); *G06F 2221/2149* (2013.01)

(58) Field of Classification Search
CPC .. G06F 3/1253; G06F 3/0482; G06F 3/04883; G06F 21/31; G06F 21/608; G06F 2221/2149
See application file for complete search history.

(56) References Cited

U.S. PATENT DOCUMENTS

| | | | | |
|---|---|---|---|---|
| 5,438,433 A | * | 8/1995 | Reifman ............ | H04N 1/00411 358/468 |
| 2014/0071060 A1 | * | 3/2014 | Santos-Gomez ..... | G06F 3/0488 345/173 |
| 2014/0126018 A1 | * | 5/2014 | Sugimoto .......... | H04N 1/00251 358/1.15 |
| 2015/0022482 A1 | * | 1/2015 | Hewitt ............... | G06F 3/04883 345/174 |
| 2016/0191730 A1 | * | 6/2016 | Ohata ................ | H04N 1/00411 358/1.15 |

(Continued)

FOREIGN PATENT DOCUMENTS

| | | |
|---|---|---|
| JP | H08152970 A | 6/1996 |
| JP | 2013218542 A | 10/2013 |

(Continued)

*Primary Examiner* — James T Tsai
(74) *Attorney, Agent, or Firm* — Canon U.S.A., Inc. IP Division

(57) ABSTRACT

An image processing apparatus includes a touch panel display configured to display an execution button provided to perform processing using a function of the image processing apparatus and realized in the form of a software key, and detect a user operation onto the execution button. The image processing apparatus includes an adjustment unit configured to adjust, in an instruction portion of a user, a time since the execution button is touched until the execution button is released therefrom according to a user operation.

19 Claims, 11 Drawing Sheets

(56) References Cited

U.S. PATENT DOCUMENTS

| | | | |
|---|---|---|---|
| 2016/0357281 A1* | 12/2016 | Fleizach | H04N 3/155 |
| 2017/0155794 A1* | 6/2017 | Sei | G06F 3/1231 |
| 2017/0208196 A1* | 7/2017 | Fujii | H04N 1/00474 |
| 2018/0225033 A1* | 8/2018 | Aratake | G06F 3/0481 |
| 2018/0234564 A1* | 8/2018 | Hirasawa | H04N 1/00432 |
| 2019/0332334 A1* | 10/2019 | Yoshihara | G06F 3/1231 |
| 2019/0392130 A1* | 12/2019 | Tazuke | H04N 1/00392 |
| 2020/0393948 A1* | 12/2020 | Thomas | G06F 1/3262 |

FOREIGN PATENT DOCUMENTS

| | | | | |
|---|---|---|---|---|
| JP | 2016226044 A | 12/2016 | | |
| JP | 2018128976 A | 8/2018 | | |
| KR | 20070097210 A | 10/2007 | | |
| KR | 20130082349 A | 7/2013 | | |
| WO | WO-2017070600 A1 * | 4/2017 | | G06F 21/31 |

* cited by examiner

FIG.5

IMAGE PROCESSING APPARATUS, METHOD FOR CONTROLLING IMAGE PROCESSING APPARATUS, AND STORAGE MEDIUM

BACKGROUND

Field of the Disclosure

The present disclosure relates to an image processing apparatus and a method for controlling the image processing apparatus, and a storage medium storing a program for performing the control method.

Description of the Related Art

Some of image processing apparatuses having the scan function, the print function, and the like are equipped with a hardware key as an operation unit that receives a user operation. An execution button, which is an example of the hardware key, is a key for performing processing using the function of the image processing apparatus, and, for example, when the execution button is selected after a print condition is set on a setting screen, print processing is performed according to this print condition.

On the other hand, there are also image processing apparatuses that include no hardware key and allow all inputs to be entered on a touch panel with the aim of a cost reduction and design improvement due to the miniaturization of the operation unit. Japanese Patent Application Laid-Open No. 2016-226044 discusses a configuration that realizes all keys including the execution button on the touch panel display.

Realizing the execution button in the form of the software key allows the execution button to be selected with a relatively lower pressure than when realizing the execution button in the form of the hardware key. On the other hand, the execution button may be undesirably selected by mistake with the sleeve of the user's clothes or the like depending on how the user operates the image processing apparatus, and unintended processing such as copying or faxing may be accidentally performed. As a result, wasteful consumption of paper, an information leak due to incorrect fax transmission, and the like undesirably occur.

One conceivable measure against it is to lower the sensitivity to a fixed level only for the execution button, but it is difficult to determine which sensitivity makes the user feel easy to use the execution button or whether it is better not to lower the sensitivity. The sensitivity here means a touch determination time taken since the button is touched until the button is released before the processing corresponding to the button is performed, and the touch determination time is to be increased to lower the sensitivity. On the other hand, the touch determination time is to be reduced to raise the sensitivity of the button.

Accordingly, there is a need to provide an execution button having sensitivity desired by the user.

SUMMARY

According to an aspect of the present disclosure, an image processing apparatus includes a touch panel display configured to display a first software key for performing processing using a function of the image processing apparatus and a second software key, and detect a user operation onto the first software key and the second software key. The image processing apparatus includes an adjustment unit configured to adjust, in an instruction portion of a user, a time since the first software key is touched until the first software key is released therefrom according to a user operation.

Further features of the present disclosure will become apparent from the following description of exemplary embodiments with reference to the attached drawings.

BRIEF DESCRIPTION OF THE DRAWINGS

FIG. 5 illustrates an example of a screen displayed on the operation unit.

DESCRIPTION OF THE EMBODIMENTS

In the following description, representative exemplary embodiments for implementing the present disclosure will be described with reference to the drawings.

First Exemplary Embodiment

Figure 1:
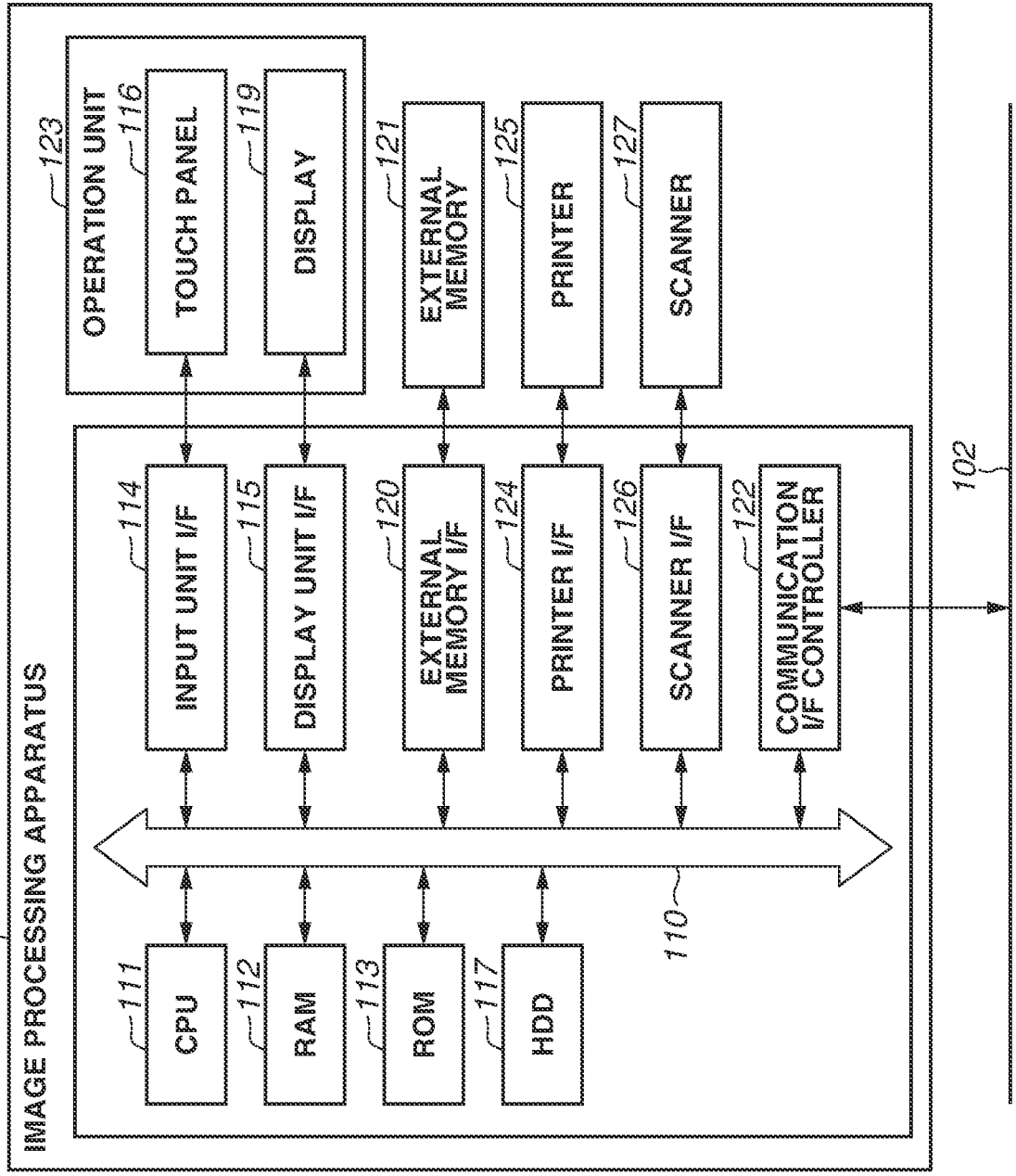
FIG. 1 is a block diagram illustrating the hardware configuration of an image processing apparatus 101.

FIG. 1 illustrates the hardware configuration of an image processing apparatus 101 to which each exemplary embodiment of the present disclosure is applicable. Referring to FIG. 1, a central processing unit (CPU) 111, a random access memory (RAM) 112, a read only memory (ROM) 113, an input unit interface (I/F) 114, a display unit I/F 115, an external memory I/F 120, a communication I/F controller 122, a printer I/F 124, and a scanner I/F 126 are connected to a system bus 110. Further, a touch panel 116, a display 119, and an external memory 121 are connected to the system bus 110. Each of the units connected to the system bus 110 is configured to be able to exchange data between each other via the system bus 110.

The ROM 113 is a nonvolatile memory, and stores image data, other data, various kinds of programs used for the CPU 111 to operate, and the like in respective predetermined areas therein.

The RAM 112 is a volatile memory, and is used as temporary storage areas, such as a main memory and a work area of the CPU 111. Further, the RAM 112 is also used as a storage area for storing image display information.

A hard disk drive (HDD) 117 is a readable and writable nonvolatile storage device, and stores therein various kinds of data, such as a program for controlling the entire image processing apparatus 101, various kinds of application programs, and setting information.

The CPU 111 controls each of the units of this image processing apparatus 101 using the RAM 112 as the work memory according to the program stored in the ROM 113 or the external memory 121.

An operation unit 123 is an interface that allows a user to operate the image processing apparatus 101 via the input unit I/F 114 and the display unit I/F 115. Further, the operation unit 123 is formed by a combination of the touch panel 116 and the display 119, and can be configured in a plurality of forms.

The input unit I/F 114 receives a user operation, generates a control signal according to the operation, and supplies it to the CPU 111. For example, the input unit I/F 114 includes a device used to input character information and issue an instruction to perform processing, such as a keyboard (not illustrated), a pointing device, such as a mouse (not illustrated) and the touch panel 116, and/or the like, as an input device that receives the user operation.

The touch panel 116 is an input device configured to output coordinate information according to a position touched on, for example, an input unit configured in a planar manner. The CPU 111 controls each of the units of this image processing apparatus 101 according to the program based on the control signal generated and supplied by the input unit I/F 114 according to the user operation performed on the input device. As a result, the user can cause the image processing apparatus 101 to operate according to the user operation. The mouse (not illustrated) may be substituted for that. The touch panel 116 may be a pressure-sensitive touch panel, which determines the user operation based on a pressure of a finger of the user, or may be a capacitance touch panel, which determines the user operation based on an electric current on the surface of the touch panel 116 that is changed by the touch operation.

The display unit I/F 115 outputs a display signal for displaying an image to the display 119. The CPU 111 supplies a generated display control signal to the display unit I/F 115 according to the program. The display unit I/F 115 displays a graphical user interface (GUT) screen forming a GUI on the display 119 based on this display control signal.

The touch panel 116 is configured integrally with the display 119. The touch panel 116 is configured in such a manner that a light transmittance thereof does not disturb the display on the display 119, and is mounted on an upper layer of a display surface of the display 119. Then, the CPU 111 associates an input coordinate on the touch panel 116 and a display coordinate on the display 119 with each other. This configuration can construct a GUI that appears as if the user can directly operate a screen displayed on the display 119.

The external memory I/F 120 is configured to allow the external memory 121, such as a hard disk, a floppy disk, a compact disk (CD), a digital versatile disk (DVD), or a memory card, to be attached thereto. The external memory I/F 120 reads out data from the mounted external memory 121 and writes data into this external memory 121 based on the control by the CPU 111.

The communication I/F controller 122 is in charge of communication directed to various kinds of networks 102, such as a local area network (LAN), the Internet, wired communication network, and wireless communication network, based on the control by the CPU 111.

The printer I/F 124 is an interface for connecting a printer 125 and the system bus 110 to each other. Image data that is to be printed by the printer 125 is transferred from the system bus 110 via the printer I/F 124, and is printed onto a recording medium (onto paper) by the printer 125.

The scanner I/F 126 is an interface for connecting a scanner 127 and the system bus 110 to each other. The scanner 127 reads out an image on a document to generate image data, and inputs the generated image data to the system bus 110 via the scanner I/F 126.

Figure 3:
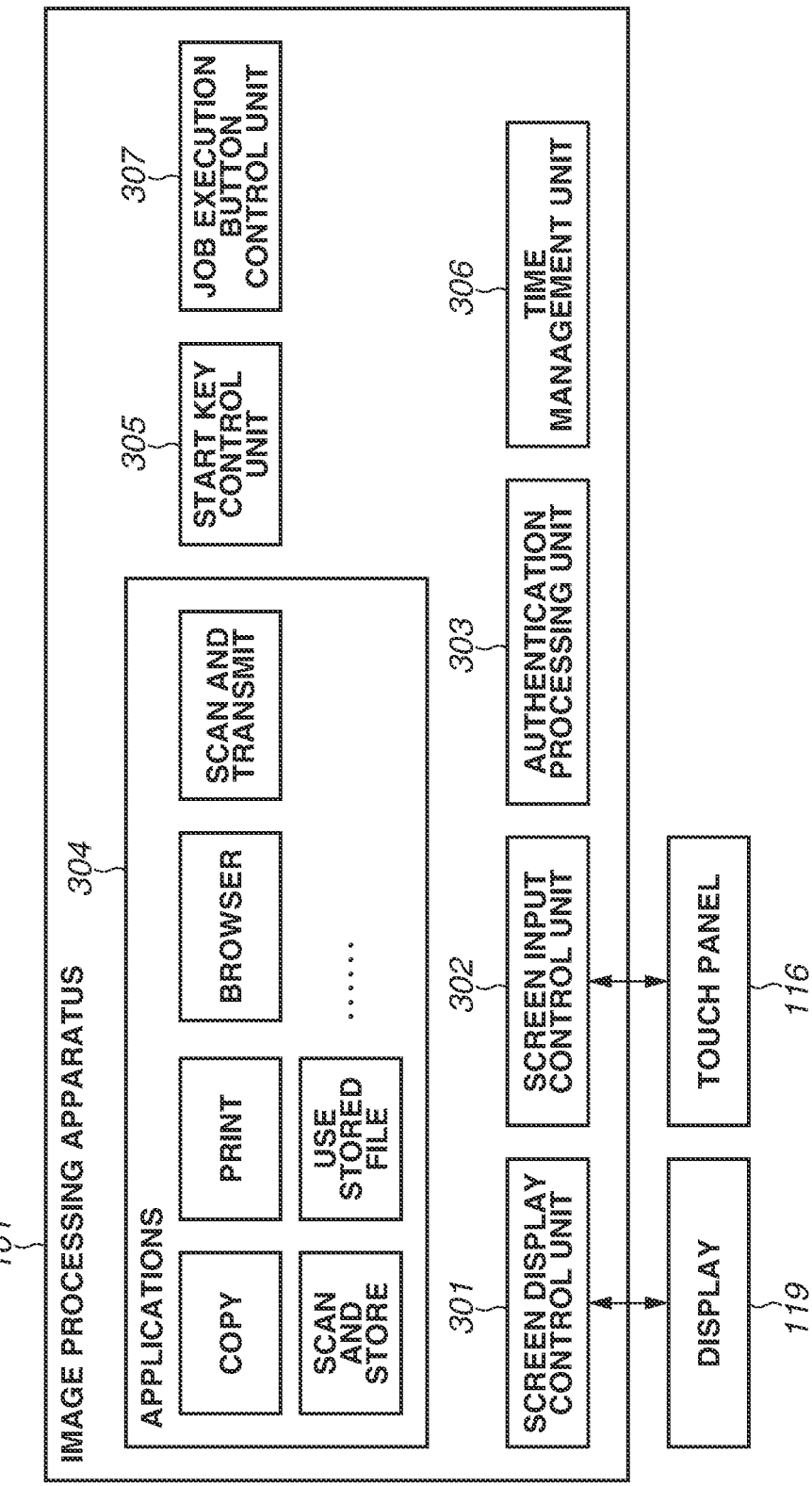
FIG. 3 is a block diagram illustrating the software configuration of the image processing apparatus.

FIG. 3 illustrates an example of the software configuration of the image processing apparatus 101 according to the present exemplary embodiment. In the present exemplary embodiment, the CPU 111 controls the RAM 112, the ROM 113, the input unit I/F 114, the display unit I/F 115, the printer I/F 124, and the scanner I/F 126 via the system bus 110 for an exchange between the illustrated software modules, unless otherwise specifically indicated.

The image processing apparatus 101 includes a screen display control unit 301, a screen input control unit 302, an authentication processing unit 303, applications 304, a time management unit 306, a start key control unit 305, and a job execution button control unit 307.

The screen display control unit 301 mainly performs processing for managing a screen of the entire application 304 and transferring information about the screen to the display 119, and processing for notifying the application 304 of an event input from the touch panel 116.

The input unit I/F 114 converts the operation from the touch panel 116 into a signal, and the screen input control unit 302 receives and analyzes this signal and converts it into an event format that can be transmitted to the application 304. Then, the screen input control unit 302 instructs the screen display control unit 301 for a notification of this input signal.

The authentication processing unit 303 displays an authentication screen on the display 119, and carries out user authentication using authentication information such as a user identification (ID) and a password input from the user onto the touch panel 116. If the user authentication has succeeded, the authentication processing unit 303 performs login processing for allowing the user to log in to the image processing apparatus 101. When a logout instruction is issued, the authentication processing unit 303 performs logout processing for allowing the user logging in at this time to log out from the image processing apparatus 101.

The applications 304 are a group of applications that run on the image processing apparatus 101, and the CPU 111 causes each of the applications 304 to operate according to the user operation via the screen input control unit 302. Representative examples among the applications 304 provided in the image processing apparatus 101 are as follows.

- a "copy" function that prints, by the printer 125, the image data generated by reading out the image on the document by the scanner 127
- a "print" function that prints image data based on a print job fed from an external apparatus, such as a personal computer (PC), by the printer 125
- a "scan and transmit" function that transmits the image data generated by reading out the image on the document by the scanner 127 to outside via the communication I/F controller 122
- a "scan and store" function that stores the image data generated by reading out the image on the document by the scanner 127 into the external memory 121
- a "use a stored file" function that prints the image data stored in the external memory 121 by the printer 125 or transmits it to outside via the communication I/F controller 122
- a "browser" function that browses, prints, and/or stores data on a web server via a web browser The applications 304 provided in the image processing apparatus 101 are not limited to the above-described examples, and an application can also be added later according to an instruction from the user.

The start key control unit 305 detects by the screen input control unit 302 that a start key, which will be described below, is pressed, and transmits a notification to execute the start key to the application 304. Upon receiving the notification to execute the start key, the application 304 conducts the corresponding function.

The time management unit 306 manages the current time since the image processing apparatus 101 is started up, and provides a notification of the current time according to an instruction from the start key control unit 305 or the job execution button control unit 307.

The job execution button control unit 307 is a function of controlling a job execution button. The job execution button refers to a button customized by the user that exists as a button other than application buttons prepared on the image processing apparatus 101 in advance (for example, a print button, a scan button, and the like). For example, supposing that a job execution button for carrying out copying with two-sided printing and a 2-in-1 layout set as conditions is generated by a user operation, these conditions are stored into the HDD 117 by the job execution button control unit 307. Further, the job execution button control unit 307 detects that the registered job execution button is pressed and calls the corresponding application 304, and executes the application 304 according to the conditions registered in advance and stored in the HDD 117.

Figure 2A:
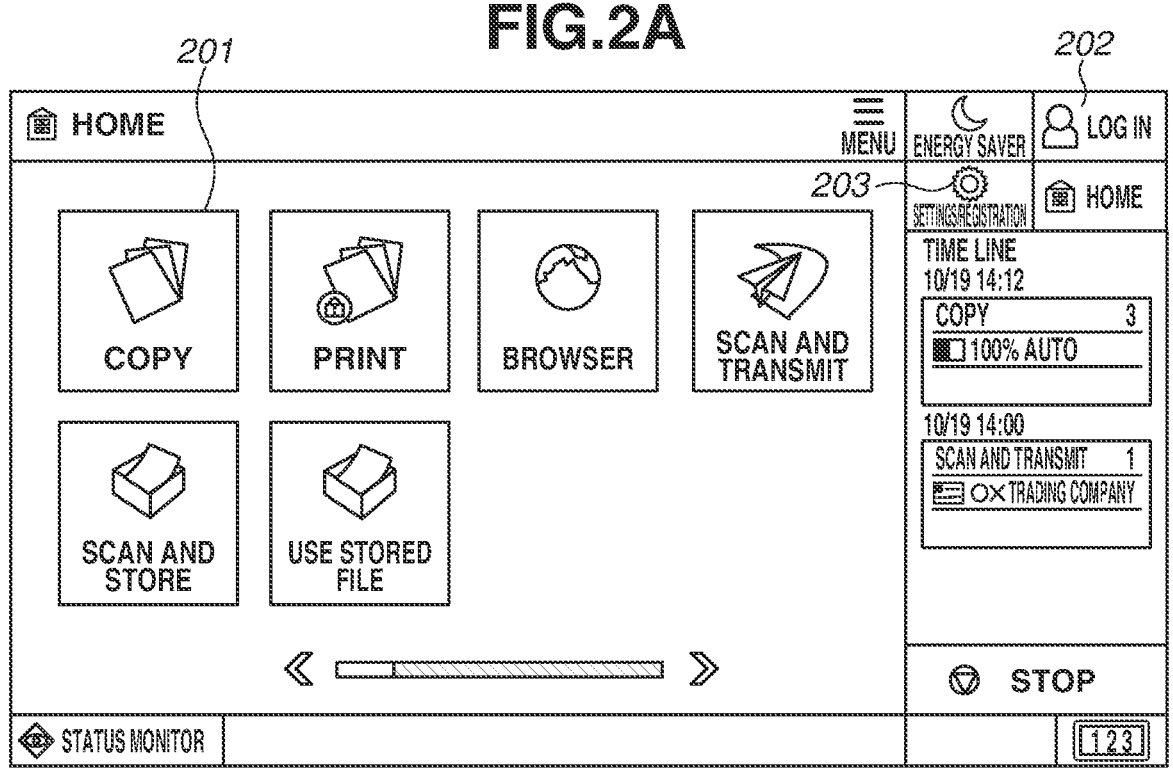
FIGS. 2A, 2B, 2C, 2D, and 2E illustrate examples of screens displayed on an operation unit 123.

Screens displayed on the display 119 will be described with reference to FIGS. 2A to 2E. FIG. 2A illustrates an example of a home screen for selecting the application 304 of the image processing apparatus 101. A copy button 201 is a button for calling an application for copying, and, when the screen input control unit 302 detects a user operation thereon, the screen display control unit 301 causes the screen to transition to FIG. 2B.

Figure 2B:
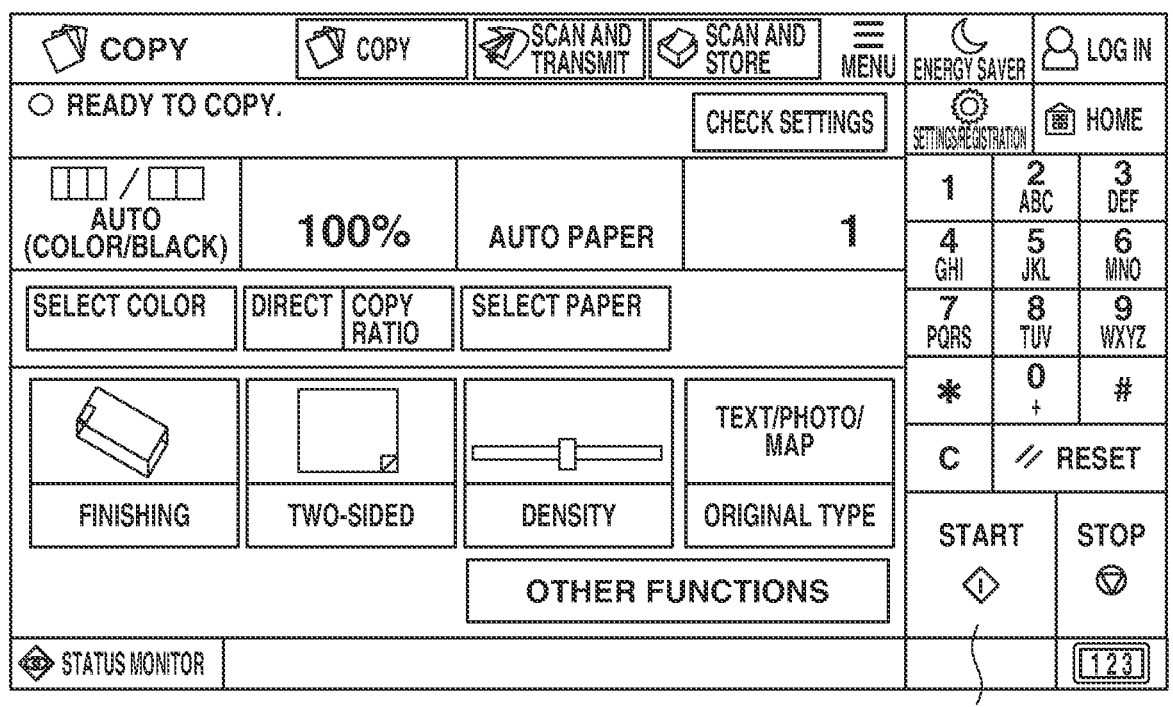
Figure 2C:
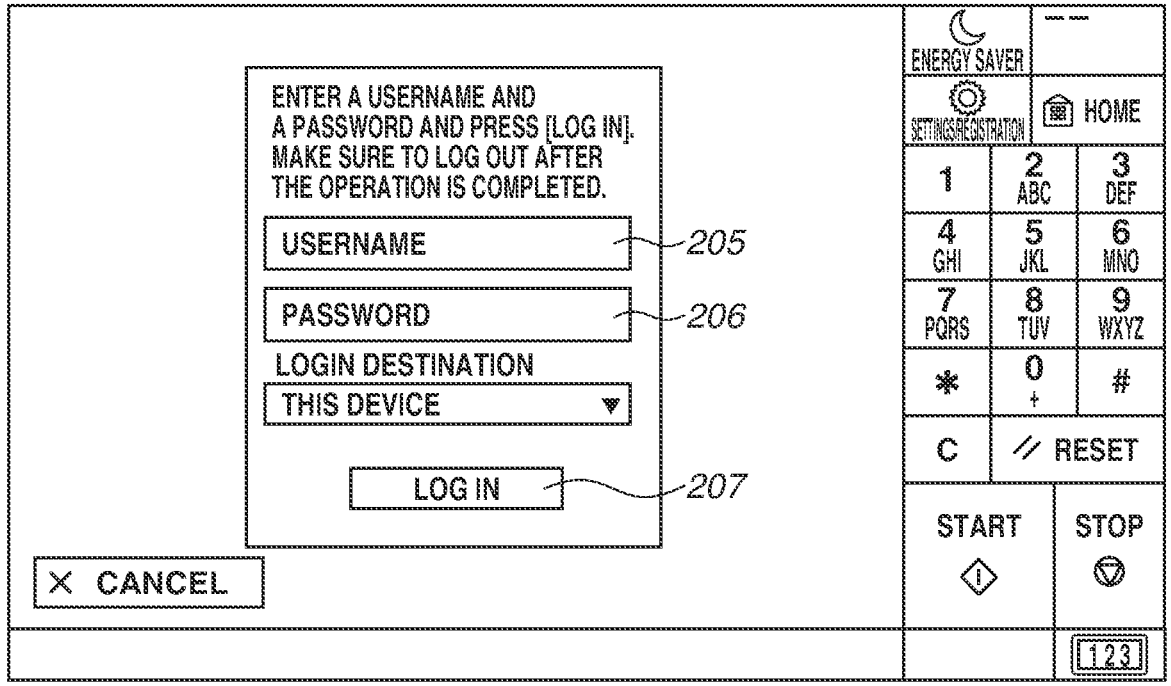

A login button 202 is a button for carrying out the user authentication, and, when the screen input control unit 302 detects a user operation thereon, the screen display control unit 301 causes the screen to transition to FIG. 2C.

Figure 2D:
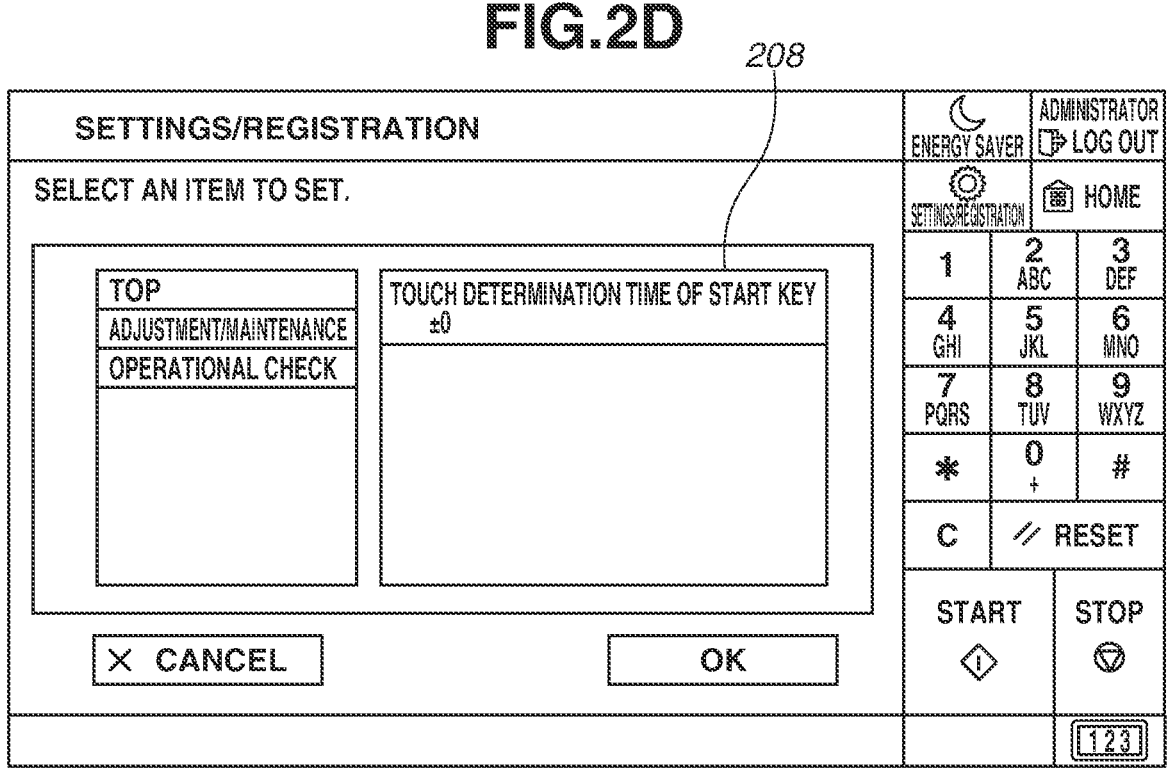

A setting/registration button 203 is a button for configuring various settings of the image processing apparatus 101, and, when the screen input control unit 302 detects a user operation thereon, the screen display control unit 301 causes the screen to transition to FIG. 2D.

FIG. 2B illustrates an example of a setting screen of the application for copying. A start key 204 is a button for performing processing according to the contents of the setting screen. In the example illustrated in FIG. 2B, because the setting screen for copying is displayed, the copy processing is performed when the start key 204 is pressed. The conditions when the copy processing is performed are set as illustrated in FIG. 2B.

FIG. 2C illustrates an example of the authentication screen. When a login button 207 is pressed with the authentication information input in a username 205 and a password 206, the authentication processing unit 303 carries out the user authentication according to the input authentication information.

FIG. 2D illustrates a screen example of a setting/registration screen for a user having an administrator authority. If the user logs in as the user having the administrator authority and presses the setting/registration button 203 in FIG. 2C, the setting/registration screen is displayed with an item 208 added thereto. In other words, items displayed on the setting/registration screen, including the item 208, vary according to the login status. The present exemplary embodiment will be described, assuming that the item 208 is not displayed unless the administrator logs in. The setting/registration screen may be configured to hide the item 208 or display the item 208 in a gray-out manner so as to prohibit it from being selected, when the user logging in at this time is not the administrator.

Figure 2E:
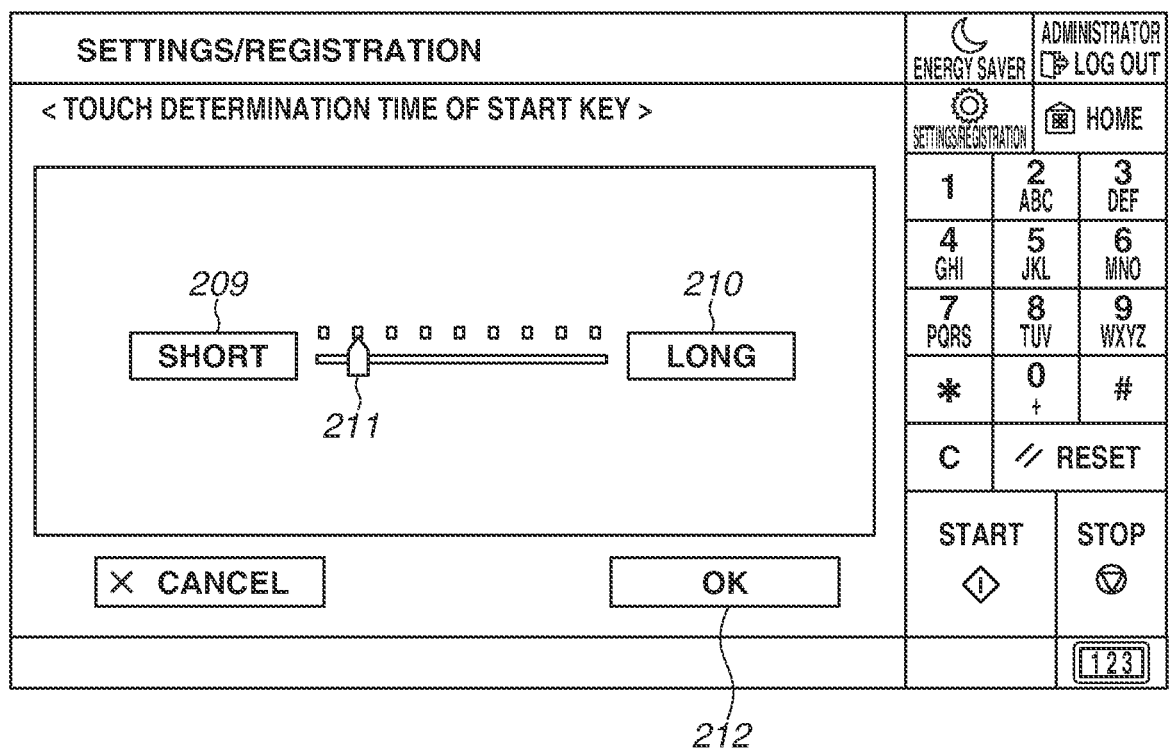

The item 208 is an item for adjusting a touch determination time of the start key 204, and, when the item 208 is pressed, the screen display control unit 301 causes the screen to transition to FIG. 2E.

FIG. 2E illustrates an example of a screen for adjusting the touch determination time of the start key 204. As will be used herein, the touch determination time refers to a time since the start key 204 is touched by an instruction portion of the user until the start key 204 is released. In other words, the start key 204 is not executed until the start key 204 is kept pressed for a time equal to the touch determination time or a time longer than that.

A button 209 and a button 210 are buttons for adjusting the touch determination time of the start key 204, and a knob 211 is moved leftward when the button 209 is pressed and moved rightward when the button 210 is pressed. The knob 211 indicates the current setting value of the touch determination time of the start key 204, and the setting value can be changed in nine levels. The touch determination time of the start key 204 reduces when the knob 211 is located in the left direction, and increases when the knob 211 is located in the right direction. The knob 211 indicates the touch determination time of the start key 204 set to the minimum value when being located at the left end, and indicates the touch determination time of the start key 204 set to the maximum value when being located at the right end.

The touch determination time of the start key 204 set to the minimum value means such a setting that the start key 204 is executed if the time since the start key 204 is pressed until the finger is separated therefrom is 0 milliseconds (msec) or longer. In this case, the predetermined processing is supposed to be performed even if the start key 204 is only released immediately after being touched by the user operation. On the other hand, the touch determination time of the start key 204 set to the maximum value means such a setting that the start key 204 is executed if the time since the start key 204 is pressed until the finger is separated therefrom is 200 msec or longer, and the start key 204 is not executed unless being kept in the pressed state for a certain time.

The knob 211 allows the touch determination time of the start key 204 to be adjusted in increments of 25 msec, and the touch determination time increases by 25 msec each time the knob 211 is moved by one step from the left end to the right end.

The initial value of the touch determination time of the start key 204 is 25 msec, and this indicates that the knob 211 is located at the position illustrated in FIG. 2E.

A button 212 is a button for finalizing the touch determination time of the start key 204 adjusted using the button 209 or the button 210.

The knob 211 is moved using the button 209 or the button 210, but the touch determination time of the start key 204 may be adjusted by directly operating the knob 211 or directly inputting the setting value. Further, the touch determination time of the start key 204 can be adjusted in nine levels, but may be adjustable steplessly. Further, the touch determination time can be adjusted from 0 msec to 200 msec, but the adjustable range may be further widened.

Figure 4:
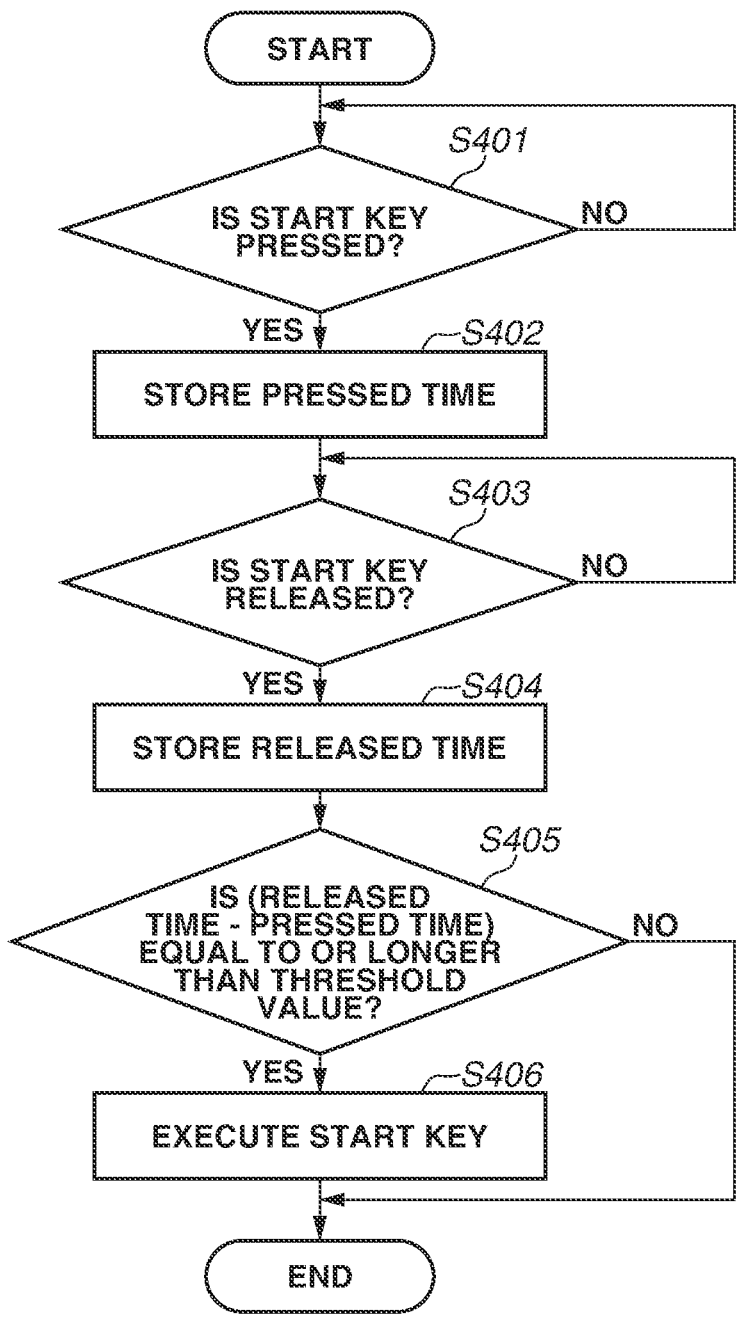
FIG. 4 is a flowchart illustrating processing for determining a touch determination time by the image processing apparatus.

FIG. 4 is a flowchart illustrating a series of processes for executing the start key 204 only when the finger is separated after the predetermined time has elapsed since the pressing of the start key 204 according to the exemplary embodiment of the present disclosure. Each operation illustrated in the flowchart of FIG. 4 is realized by the CPU 111 of the image processing apparatus 101 reading out the control program stored in the ROM 113 or the external memory 121 into the RAM 112 and executing it. The present flow is started by the CPU 111 detecting that the image processing apparatus 101 is started up.

In step S401, the screen input control unit 302 determines whether the start key 204 is pressed. If the screen input control unit 302 determines that the start key 204 is pressed (YES in step S401), the processing proceeds to step S402. On the other hand, if the screen input control unit 302 determines that the start key 204 is not pressed (NO in step S401), the processing returns to step S401.

In step S402, the start key control unit 305 acquires the time at which the start key 204 has been pressed from the time management unit 306, and stores it into the RAM 112. In the present example, suppose that the touched time is "Jan. 1, 2019 at 09:32:11:022".

In step S403, the screen input control unit 302 determines whether the finger is separated from the start key 204. If the screen input control unit 302 determines that the finger is separated from the start key 204 (YES in step S403), the processing proceeds to step S404. On the other hand, if the screen input control unit 302 determines that the finger is not separated from the start key 204 (NO in step S403), the processing returns to step S403.

In step S404, the start key control unit 305 acquires the time at which the finger has been separated from the start key 204 from the time management unit 306, and stores it into the RAM 112. In the present example, suppose that the released time is "Jan. 1, 2019 at 09:32:11:052".

After that, in step S405, the start key control unit 305 acquires the difference between the time stored in step S404 and the time stored in step S402, and calculates the time length since the start key 204 has been pressed until the finger has been separated therefrom. Then, the start key control unit 305 acquires the touch determination time set in FIG. 2E from the RAM 112, and determines whether the calculated time length is equal to or longer than the set touch determination time. For example, when the touch determination time is set to the initial value as illustrated in FIG. 2E, the start key control unit 305 determines whether the calculated time length is 25 msec or longer.

If the start key control unit 305 determines that the calculated time length is equal to or longer than the set touch determination time (YES in step S405), the processing proceeds to step 406. On the other hand, if the start key control unit 305 determines that the calculated time length is not equal to or longer than the set touch determination time (NO in step S405), the processing ends without anything performed.

In step S406, the start key control unit 305 transmits the notification to execute the start key 204 to the currently displayed application 304, and the corresponding application 304 performs the processing. More specifically, since the time at which the start key 204 has been touched is "Jan. 1, 2019 at 09:32:11:022" and the time at which the start key 204 has been released is "Jan. 1, 2019 at 09:32:11:052", the difference therebetween is "30" msec. Because this difference exceeds the "25" msec, which is the touch determination time, the processing proceeds to step S406 and the processing according to the start key 204 is performed.

Assume that, when the start key 204 is touched by the user, the display manner of the start key 204 (for example, the color, the shape, the size, and the like thereof) is changed to make the user aware that the start key 204 is in the touched state. Assume that the display manner of the start key 204 is changed according to the detection of the touch operation, and returns to the state before the touch operation is detected when the release of the start key 204 is detected regardless of the result of the determination about the touch determination time.

In this manner, the touch determination time can be adjusted by the user operation, and the start key 204 can be executed only when the time since the start key 204 is pressed until the finger is separated therefrom is equal to or longer than the touch determination time. As a result, the operational feeling desired by the user can be realized.

Second Exemplary Embodiment

The first exemplary embodiment has been described regarding the configuration in which the user logs in with the administrator authority and adjusts the touch determination time of the start key 204. This configuration means that the result of setting the touch determination time in FIG. 2D is applied regardless of the login user. The present exemplary embodiment will be described regarding a configuration in which the touch determination time of the start key 204 can be set for each login user. In other words, assume that the touch determination time set with the administrator logging in is applied only when the administrator is logging in, and the touch determination time set with a user A logging in is applied only when the user A is logging in. The descriptions of features already described in the first exemplary embodiment will be omitted below.

Figure 5:
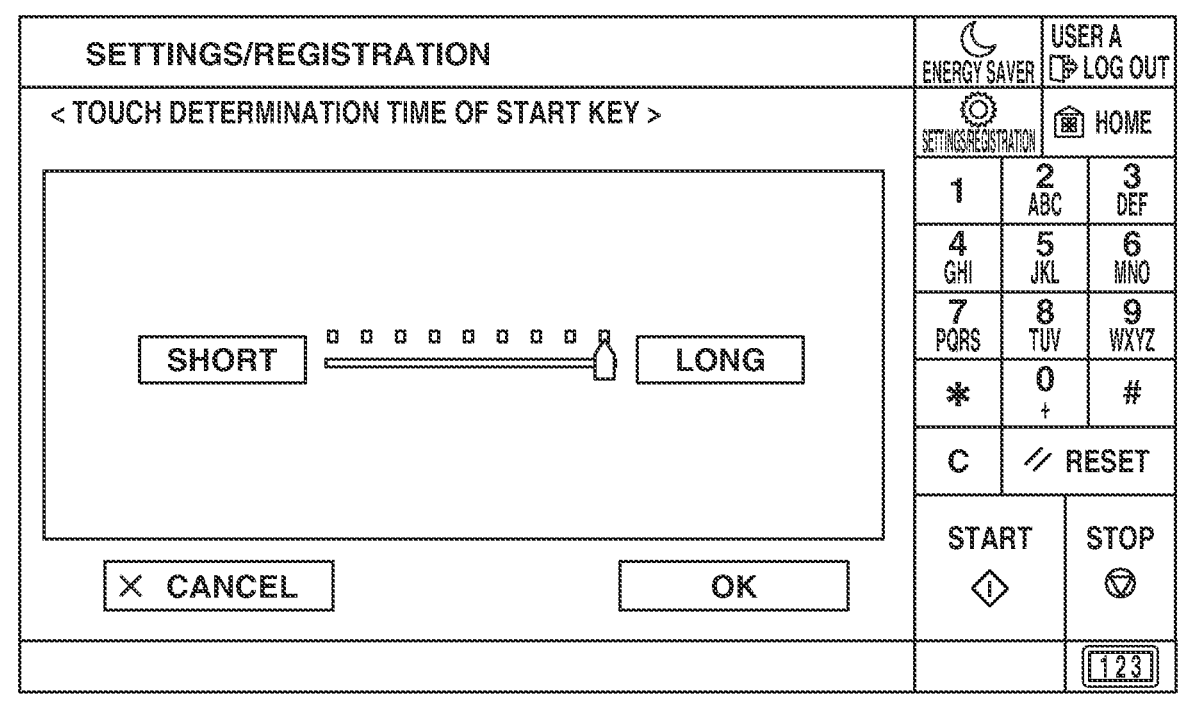

FIG. 5 illustrates an example when the screen for adjusting the touch determination time of the start key 204 is displayed with the user A logging in in FIG. 2D, and illustrates the screen with the touch determination time of the start key 204 set in the longest state.

The setting/registration button 203 is selected with the user A logging in, and the item 208 is displayed. As a result, the screen illustrated in FIG. 5 is displayed. The item 208 is an item displayed with the administrator logging in similarly to the item 208 at the time of the first exemplary embodiment or with a general user such as the user A logging in.

Figure 6:
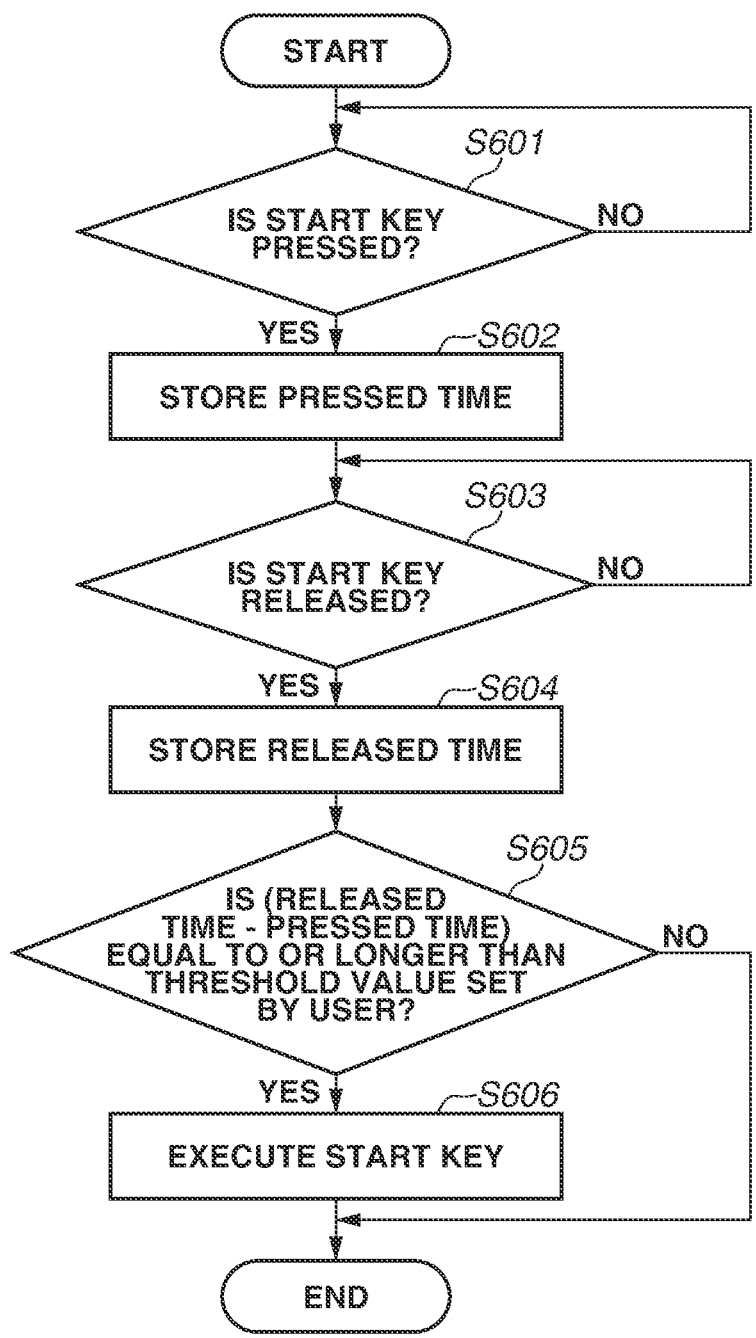
FIG. 6 is a flowchart illustrating processing for determining the touch determination time by the image processing apparatus.

FIG. 6 is a flowchart illustrating a series of processes for executing the start key 204 according to the touch determination time of the start key 204 that is set by the login user. Each operation illustrated in the flowchart of FIG. 6 is realized by the CPU 111 of the image processing apparatus 101 reading out the control program stored in the ROM 113 or the external memory 121 into the RAM 112 and executing it. The present flow is started by the CPU 111 detecting that the image processing apparatus 101 is started up.

Steps S601 to S604 and S606 are similar to the contents of steps S401 to S404 and S406 illustrated in FIG. 4, and therefore will not be described here.

In step S605, the start key control unit 305 acquires the difference between the time stored in step S604 and the time stored in step S602, and calculates the time length since the start key 204 has been pressed until the finger has been separated therefrom. The authentication processing unit 303 acquires the authentication information of the user logging in at this time (the user A in this example), and the start key control unit 305 acquires the touch determination time stored in association with the authentication information from the RAM 112 and determines whether the calculated time length is equal to or longer than the set touch determination time. For example, if the user is logging in as the user A as illustrated in FIG. 5, the start key control unit 305 determines whether the calculated time length is 200 msec or longer. On the other hand, if the administrator is logging in at this time, the start key control unit 305 determines whether the calculated time length is 25 msec or longer based on the touch determination time set in FIG. 2D.

A table 1 indicates an example of the information managed in the RAM 112. The user ID contained in the user authentication information and the touch determination time set by this user are managed in association with each other.

TABLE 1

| User ID | Touch Determination Time (msec) |
|---|---|
| Administrator | 25 |
| User B | 0 |
| User A | 200 |

If the start key control unit 305 determines that the calculated time length is equal to or longer than the set touch determination time (YES in step S605), the processing proceeds to step S606. On the other hand, if the start key control unit 305 determines that the calculated time length is not equal to or longer than the set touch determination time (NO in step S605), the processing ends without anything performed.

In this manner, the sensitivity of the start key 204 desired by each user can be realized by making the determination according to the touch determination time of the start key 204 set by the login user.

The applied touch determination time in a state before a login (for example, FIG. 2A) may be a default touch determination time, or the touch determination time set by the administrator user may be applied as it.

Third Exemplary Embodiment

In the first exemplary embodiment, whether to execute the key is determined with respect to the start key 204. The present exemplary embodiment will be described regarding an example that performs processing for determining whether to execute a button for performing processing in the image processing apparatus 101 that is not the start key 204.

Figure 7:
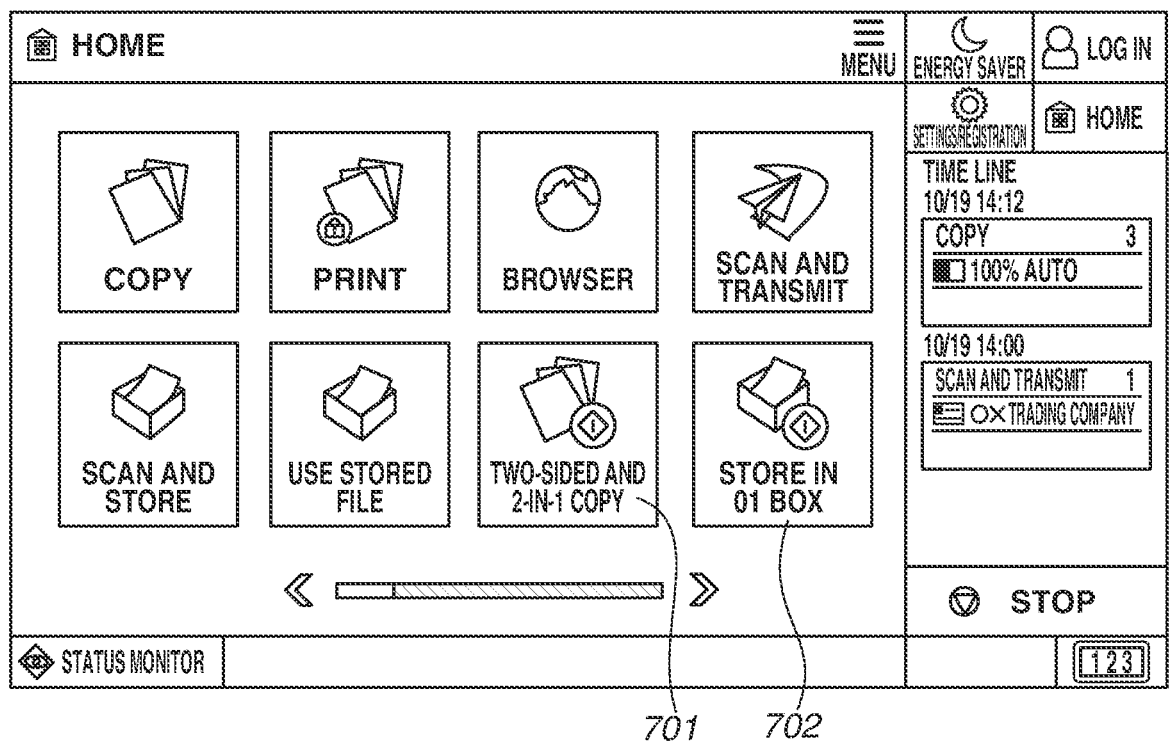
FIG. 7 illustrates an example of a screen displayed on the operation unit.

FIG. 7 illustrates an example of the home screen for selecting the application 304 of the image processing apparatus 101. A job execution button 701 is a button for executing the preset application for copying, and, when the screen input control unit 302 detects that the user presses it, the copy processing is performed according to the preset setting content without the setting screen (for example, FIG. 2B) displayed. For example, a job execution button 702 is a button for executing the preset "scan and store" application, and, when the screen input control unit 302 detects that the user presses it, the processing for scanning the image and storing the scanned data is performed. The job execution buttons 701 and 702 are buttons registered while the execution condition of the corresponding application is set in advance, and the processing is performed according to this execution condition at the moment when the button is pressed.

Figure 9:
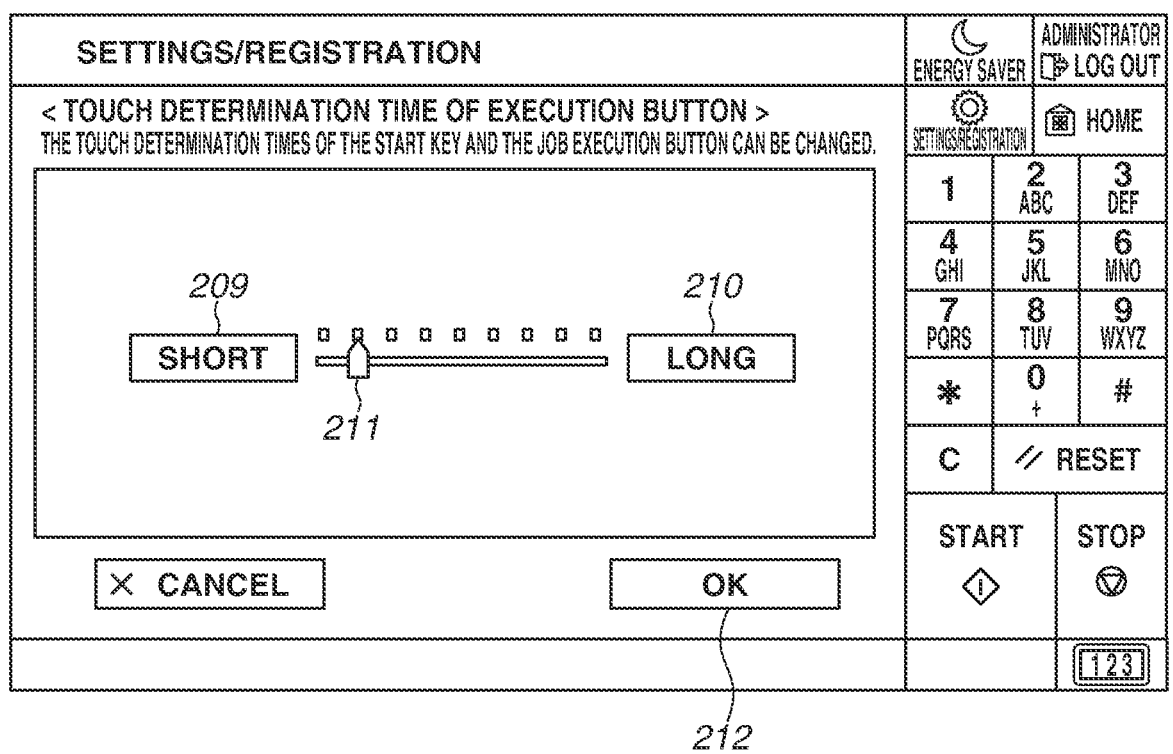
FIG. 9 illustrates an example of a screen displayed on the operation unit.

Assume that the touch determination times of these job execution buttons 701 and 702 can also be adjusted. An example of the screen at the time of the adjustment is configured as illustrated in FIG. 9. The specific adjustment method has been described already with reference to FIGS. 2D and 2E, and therefore the description thereof will be omitted here. In FIG. 9, the touch determination times of both the start key and the job execution button can be adjusted on one adjustment screen. However, the image processing apparatus 101 may be configured to allow the respective touch determination times of the start key and the job execution button to be changed on different screens or as different items. The "execution button" in FIG. 9 is a collective term for buttons such as the start key and the job execution button, and refers to a button for performing the processing without the setting screen displayed when the corresponding button is selected.

Figure 8:
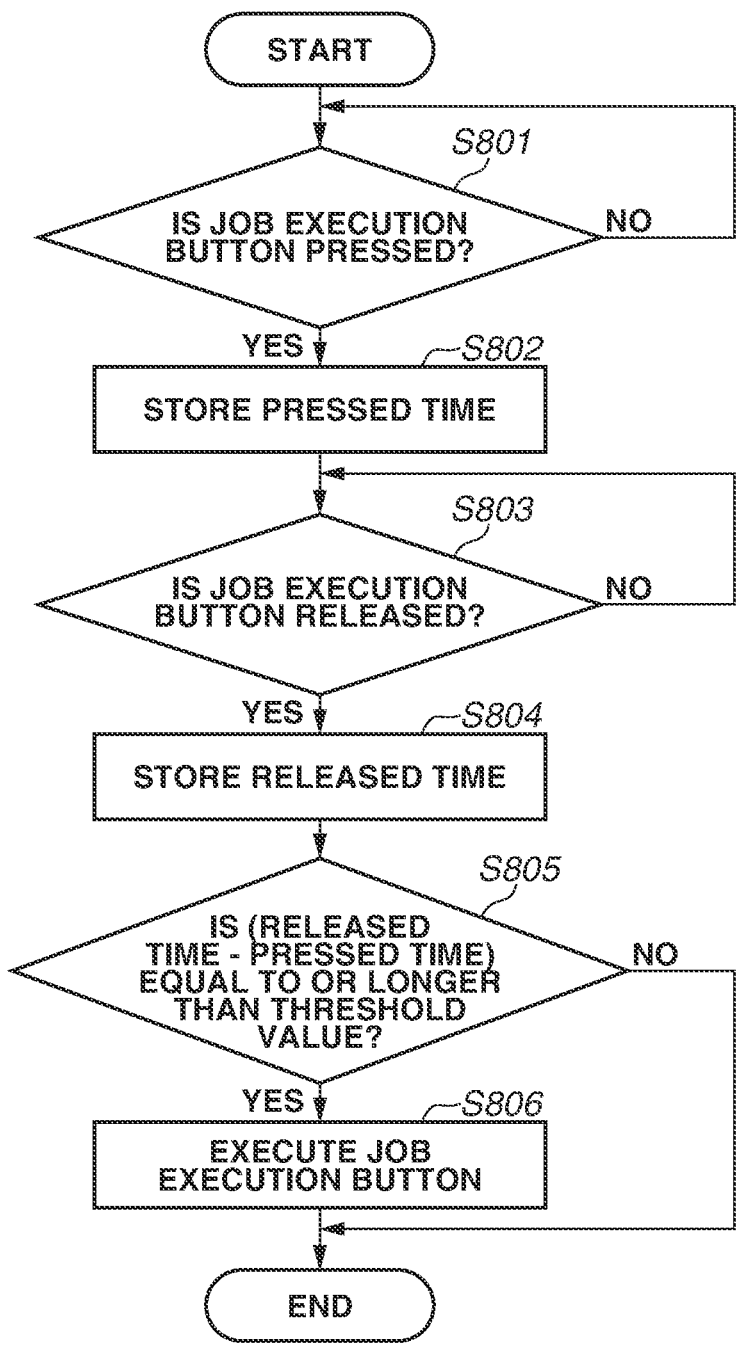
FIG. 8 is a flowchart illustrating processing for determining the touch determination time by the image processing apparatus.

FIG. 8 is a flowchart illustrating a series of processes for determining whether to execute the job execution button 701 or 702 according to the exemplary embodiment of the present disclosure. Each operation illustrated in the flowchart of FIG. 8 is realized by the CPU 111 of the image processing apparatus 101 reading out the control program stored in the ROM 113 or the external memory 121 into the RAM 112 and executing it. The present flow is started by the CPU 111 detecting that the image processing apparatus 101 is started up.

In step S801, the screen input control unit 302 determines whether the job execution button 701 or 702 is pressed. If the screen input control unit 302 determines that the job execution button 701 or 702 is pressed (YES in step S801), the processing proceeds to step S802. On the other hand, if the screen input control unit 302 determines that the job execution button 701 or 702 is not pressed (NO in step S801), the processing returns to step S801.

In step S802, the job execution button control unit 307 acquires the time at which the job execution key 701 or 702 has been pressed from the time management unit 306, and stores it into the RAM 112.

After that, in step S803, the screen input control unit 302 determines whether the finger is separated from the job execution button 701 or 702. If the screen input control unit 302 determines that the finger is separated from the job execution button 701 or 702 (YES in step S803), the processing proceeds to step S804. On the other hand, if the screen input control unit 302 determines that the finger is not separated from the job execution button 701 or 702 (NO in step S803), the processing returns to step S803.

In step S804, the job execution button control unit 307 acquires the time at which the finger has been separated from the job execution button 701 or 702 from the time management unit 306, and stores it into the RAM 112.

After that, in step S805, the job execution button control unit 307 acquires the difference between the time stored in step S804 and the time stored in step S802, and calculates the time length since the job execution button 701 or 702 has been pressed until the finger has been separated therefrom. Then, the job execution button control unit 307 acquires the touch determination time set in FIG. 2E from the RAM 112, and determines whether the calculated time length is equal to or longer than the set touch determination time.

If the job execution button control unit 307 determines that the calculated time length is equal to or longer than the set touch determination time (YES in step S805), the processing proceeds to step S806. On the other hand, if the job execution button control unit 307 determines that the calculated time length is not equal to or longer than the set touch determination time (NO in step S805), the processing ends without anything performed.

In step S806, the job execution button control unit 307 calls the corresponding application 304, and executes the application 304 according to the setting registered in advance and stored in the HDD 117.

In this manner, the touch determination time can be adjusted with respect to not only the start key 204 but also a button for performing the processing without the intervention of the setting screen when this button is pressed, like the job execution buttons 701 and 702. As a result, the sensitivity of the job execution button desired by the user can be realized.

Other Embodiments

The first to third exemplary embodiments have been described regarding the configuration that adjusts the touch determination time of the specific button (the execution button). However, the target with respect to which the touch determination time can be adjusted is not limited to the button and may be a specific region. For example, a "timeline" region is prepared below the setting/registration button 203 in FIG. 2A, and two history buttons of "copy" and "scan and transmit" are disposed in this region. These buttons each represent the setting content of the processing performed by the image processing apparatus 101 that is displayed as a history, and, when the history button is selected, the setting screen (FIG. 2B) with the corresponding setting content reflected therein is displayed. When the user presses the start key 204 after confirming the setting content on this setting screen, the processing is supposed to be performed according to the setting content of the history button. In a case where the image processing apparatus 101 can be set to "immediate execution", which performs the processing according to the setting content without the intervention of the setting screen when any of these history buttons is pressed, the image processing apparatus 101 may be configured to allow the touch determination time of the timeline region itself to be changed so as to prevent the history button from being selected by mistake and unintended processing from being performed. It is apparent that the image processing apparatus 101 may be configured to allow the touch determination time of the history button to be changed.

The above-described exemplary embodiments have been described based on the image processing apparatus 101 having a plurality of functions, such as the copy function and the scanner function, by way of example, but the present disclosure can also be applied to even an image processing apparatus having only a part of functions among them. Further, the present disclosure may also be applied to another information processing apparatus, such as a personal computer, a personal digital assistant (PDA), a mobile phone, a facsimile machine (FAX), a camera, a video camera, or another image viewer.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2019-194554, filed Oct. 25, 2019, which is hereby incorporated by reference herein in its entirety.

What is claimed is:

1. An image processing apparatus including a touch panel display comprising:
   a memory; and at least one processor in communication with the memory which executes the following:
   displaying a plurality of software keys for receiving input from a user, including a first software key on a screen, the first software key being a common software key provided for instructing to perform a plurality of functions including a first function using a copy function, a second function using a print function, and a third function using a scan function;
   providing a setting screen including an item to be used for the user to set sensitivity of the first software key, wherein sensitivity of other software keys other than the first software key in the software keys is not set by using the item; and
   performing one of the plurality of functions based on touching the first software key,
   wherein the setting screen is displayed when the user being an administrator logs in, and is not displayed when a user other than the administrator logs in.

2. The image processing apparatus according to claim 1, wherein the screen is a setting screen that sets values used for image processing, and
   wherein the plurality of software keys include a software key setting the value used for the image processing.

3. The image processing apparatus according to claim 1, wherein the image processing apparatus displays a setting screen for setting a condition when performing image processing, and
   wherein the first software key is a software key for performing the image processing without intervention of the setting screen and the first software key is displayed on a menu screen including a software key to display the setting screen.

4. The image processing apparatus according to claim 1, wherein the image processing apparatus performs image processing including at least a copy processing and a scan processing and a print processing.

5. The image processing apparatus according to claim 1, wherein the sensitivity of the first software key includes a touch duration time, and
   wherein the touch duration time takes from the first software key is touched until the first software key is released.

6. The image processing apparatus according to claim 5, wherein the touch duration time of the first software key is set longer than a touch duration time for which the other software keys included on the screen are determined to be touched.

7. The image processing apparatus according to claim 1, wherein the first software key is a start key and the other software keys are numeric keys.

8. The image processing apparatus according to claim 1, wherein the image processing apparatus is used by a plurality of users, and
wherein the sensitivity of the first software key is set for each of the plurality of users.

9. The image processing apparatus according to claim 1, wherein an item for displaying the setting screen is displayed when the user being the administrator logs in, and
wherein the item for displaying the setting screen is not displayed when the user other than the administrator logs in.

10. The image processing apparatus according to claim 9, wherein the item for displaying the setting screen is hidden or gray-out displayed when the user other than the administrator logs in.

11. The image processing apparatus according to claim 1, wherein the first software key is changed from in a first display manner to in a second display manner based on detection of the touching operation of the user, and
wherein the first software key is changed from in the second display manner to in the first display manner based on detection of the touching operation of the user.

12. A non-transitory computer-readable storage medium storing instructions that when executed perform a method for controlling an image apparatus, image processing apparatus including a touch panel display comprising:
displaying a plurality of software keys for receiving input from a user, including a first software key on a screen, the first software key being a common software key provided for instructing to perform a plurality of functions including a first function using a copy function, a second function using a print function, and a third function using a scan function;
providing a setting screen including an item to be used for the user to set sensitivity of the first software key, wherein sensitivity of other software keys other than the first software key in the software keys is not set by using the item; and
performing one of the plurality of functions based on touching the first software key,
wherein the setting screen is displayed when the user being an administrator logs in, and is not displayed when a user other than the administrator logs in.

13. A method for controlling an image processing apparatus, the image processing apparatus including a touch panel display comprising:
displaying a plurality of software keys for receiving input from a user, including a first software key on a screen, the first software key being a common software key provided for instructing to perform a plurality of functions including a first function using a copy function, a second function using a print function, and a third function using a scan function;
providing a setting screen including an item to be used for the user to set sensitivity of the first software key, wherein sensitivity of other software keys other than the first software key in the software keys is not set by using the item; and
performing one of the plurality of functions based on touching the first software key,
wherein the setting screen is displayed when the user being an administrator logs in, and is not displayed when a user other than the administrator logs in.

14. The method according to claim 13, further comprising:
setting the sensitivity of the first software key based on operating by a user,
wherein the sensitivity of the first software key is set independently of the sensitivity of other software keys.

15. The method according to claim 13, further comprising:
providing an operating screen to set the sensitivity of the first software key,
wherein the sensitivity of the first software key is set independently of the sensitivity of other software keys on the operating screen.

16. The method according to claim 13, wherein the sensitivity of the first software key includes a touch duration time, and
wherein the touch duration time takes from the first software key is touched until the first software key is released.

17. The method according to claim 16, wherein the touch duration time of the first software key is set longer than a touch duration time for which the other software keys included on the screen are determined to be touched.

18. The method according to claim 13, wherein the first software key is a start key and the other software keys are numeric keys.

19. The method according to claim 13, wherein the image processing apparatus performs image processing including at least a copy processing and a scan processing and a print processing.

* * * * *